(12) United States Patent
Becker et al.

(10) Patent No.: US 6,557,038 B1
(45) Date of Patent: Apr. 29, 2003

(54) METHOD AND APPARATUS FOR MAINTAINING SESSION STATES

(75) Inventors: Craig Henry Becker, Austin, TX (US); Matthew Dale McClain, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/343,358

(22) Filed: Jun. 30, 1999

(51) Int. Cl.[7] ............................................... G06F 15/16
(52) U.S. Cl. ....................................... 709/227; 709/228
(58) Field of Search ................................. 709/227–228

(56) References Cited

U.S. PATENT DOCUMENTS

| | | | | |
|---|---|---|---|---|
| 4,941,089 A | * | 7/1990 | Fischer | |
| 5,961,601 A | * | 10/1999 | Iyengar | |
| 6,006,266 A | * | 12/1999 | Murphy, Jr. et al. | |
| 6,006,269 A | * | 12/1999 | Phaal | |
| 6,061,741 A | * | 5/2000 | Murphy, Jr. et al. | |
| 6,076,108 A | * | 6/2000 | Courts et al. | |
| 6,157,944 A | * | 12/2000 | Pedersen | |
| 6,161,125 A | * | 12/2000 | Traversat et al. | |
| 6,212,192 B1 | * | 4/2001 | Mirashrafi et al. | |

OTHER PUBLICATIONS

Multiplexing Of Clients and Applications Among Multiple Servers, Serial #08/785,915, Filed Jan. 21, 1997, pp. 1–45, International Business Machines Corporation.

* cited by examiner

*Primary Examiner*—Emanuel Todd Voeltz
(74) *Attorney, Agent, or Firm*—Duke W. Yee; Marilyn Smith Dawkins

(57) ABSTRACT

A method in a data processing system for maintaining a session through a stateless protocol. A page is received from a source through the stateless protocol. Responsive to a display of the page in the data processing system, an indication is sent to the source through the connectionless protocol in response to a periodic event, wherein the indication prevents a termination of the session at the source.

36 Claims, 5 Drawing Sheets

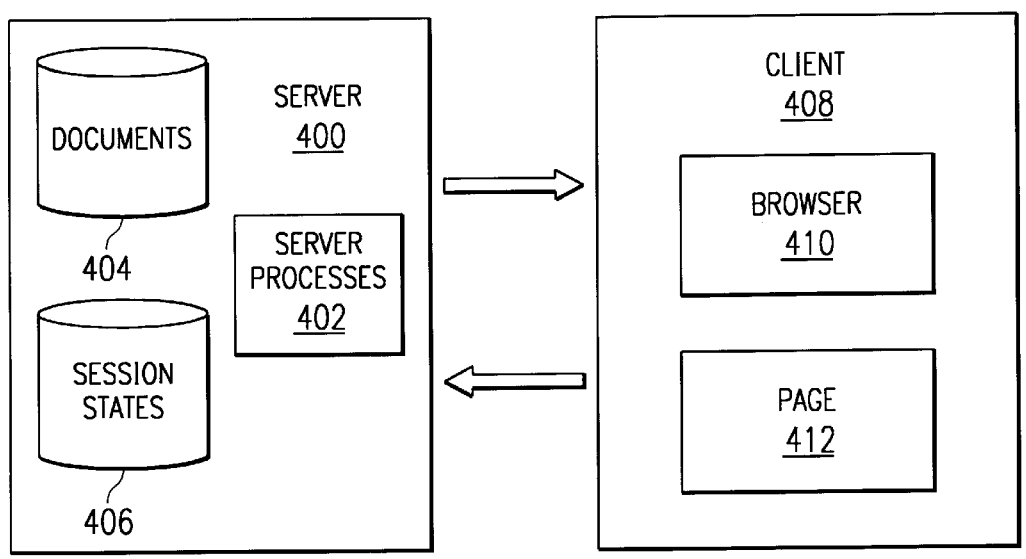
FIG. 4
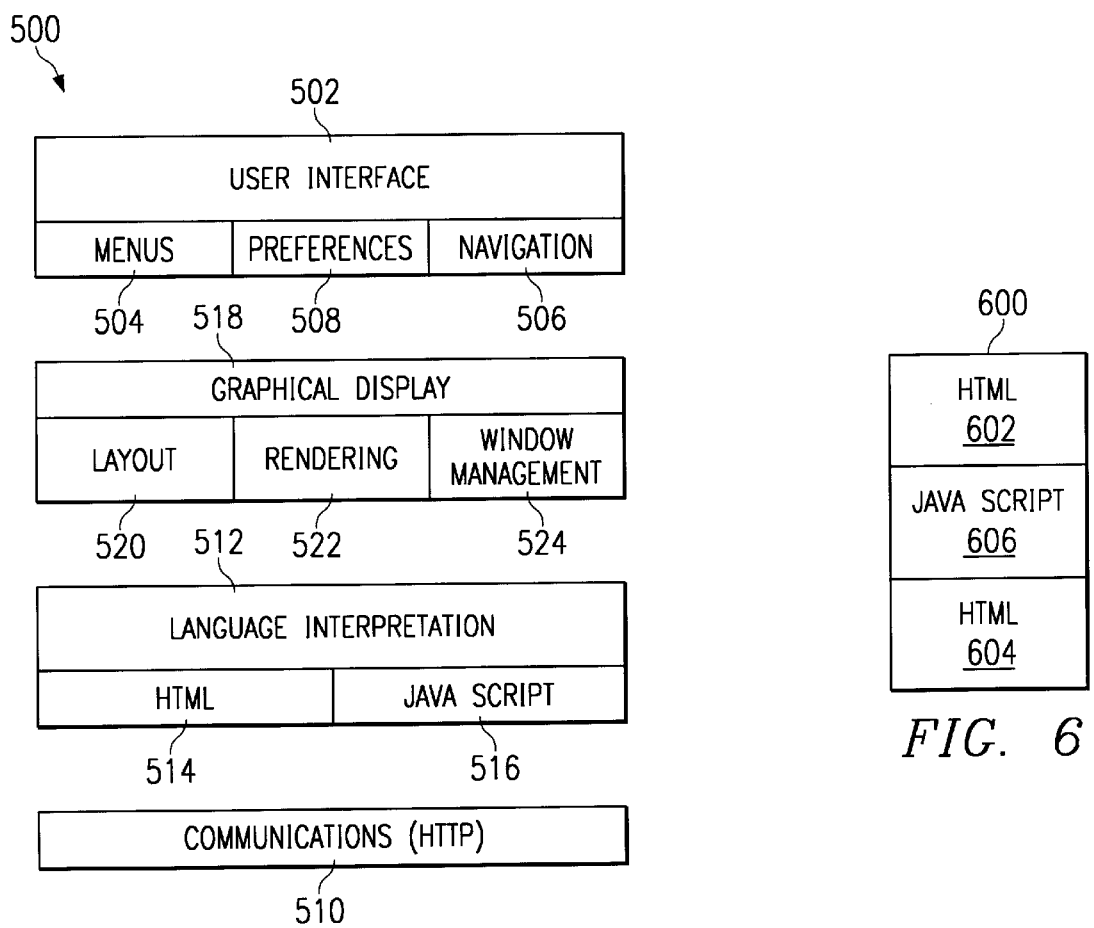
FIG. 5
FIG. 6

METHOD AND APPARATUS FOR MAINTAINING SESSION STATES

BACKGROUND OF THE INVENTION

1. Technical Field

The present invention relates generally to an improved data processing system and in particular to a method and apparatus for maintaining session states. Still more particularly, the present invention relates to a method and apparatus for handling session states over a distributed data processing system in which the protocol used is a stateless protocol.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

Internet workstations are connectionless-oriented socket clients or applications that connect to a server only long enough to retrieve an installment of data.

Once the data is retrieved, connectionless oriented socket applications generally disconnect until the next data transaction is initiated by the client. Connection oriented applications assume that the client maintains the connection to the server for the duration of the session. The client only disconnects when the session is being ended.

With connection-oriented applications, the identity and synchronization of both the client and server are known to both sides of the connection. Thus, it is taken for granted that the client is trusted and the data exchange is synchronized (in particular, the "current" or "active" application panel is known).

However, in connectionless-oriented applications, in which the Hypertext Transfer Protocol (HTTP) class of service belongs, this connection is not maintained, and thus the identity and synchronization of either the client or server, or both, may change unknown to the other side. This has the potential to result in "out-of-sync" data exchanges, and it is not known if the reconnecting client was the original session initiator. This could "break" an application or expose sensitive data to another, unauthorized client. Consequently, a need is present in the art to assure that once an application is started with a given web browser, another browser cannot come along and connect or "spoof" (that is, steal, or take over) that browser's connection and application.

HTTP is inherently a stateless protocol. As a result, a mechanism is used to keep the state for an application on a server. A common mechanism involves storing the session state for a fixed period of time. Typically, a daemon process checks the session state periodically. If the session state is older than a certain threshold, the session state is deleted. Problems are associated with such a mechanism in that if the threshold is too long, a security hole may occur. Alternatively, if the threshold is too short, the user must continually re-logon or reinitiate the session.

Therefore, it would be advantageous to have an improved method and apparatus for maintaining a session state over as stateless protocol, such as HTTP. It would be advantageous to have a method and apparatus to maintain a session state for as long as the user has the page up in the user's browser.

SUMMARY OF THE INVENTION

A method in a data processing system for maintaining a session through a stateless protocol. A page is received from a source through the stateless protocol. Responsive to a display of the page in the data processing system, an indication is sent to the source through the connectionless protocol in response to a periodic event, wherein the indication prevents a termination of the session at the source.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram illustrating the process used in maintaining session state depicted in accordance with a preferred embodiment of the present invention;

FIG. 5 is a block diagram of a browser program depicted in accordance with a preferred embodiment of the present invention;

FIG. 6 is a web page depicted in accordance with a preferred embodiment of the present invention;

DETAILED DESCRIPTION OF THE PREFERRED EMBODIMENT

Figure 1:
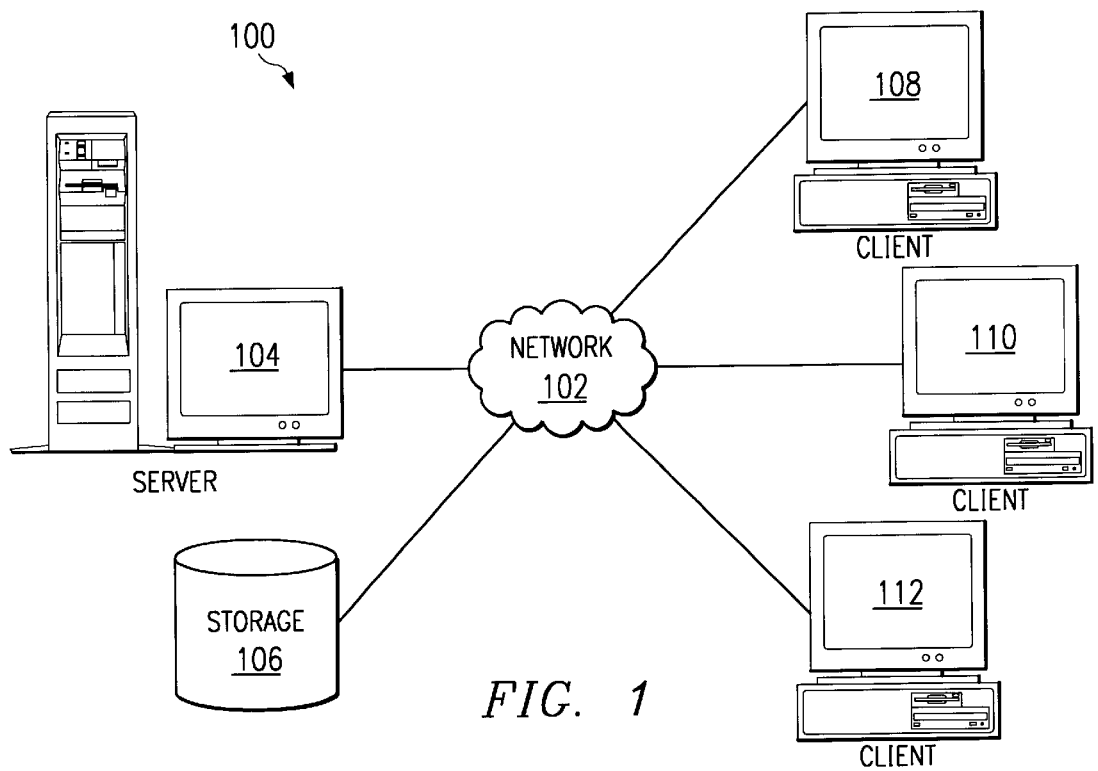
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
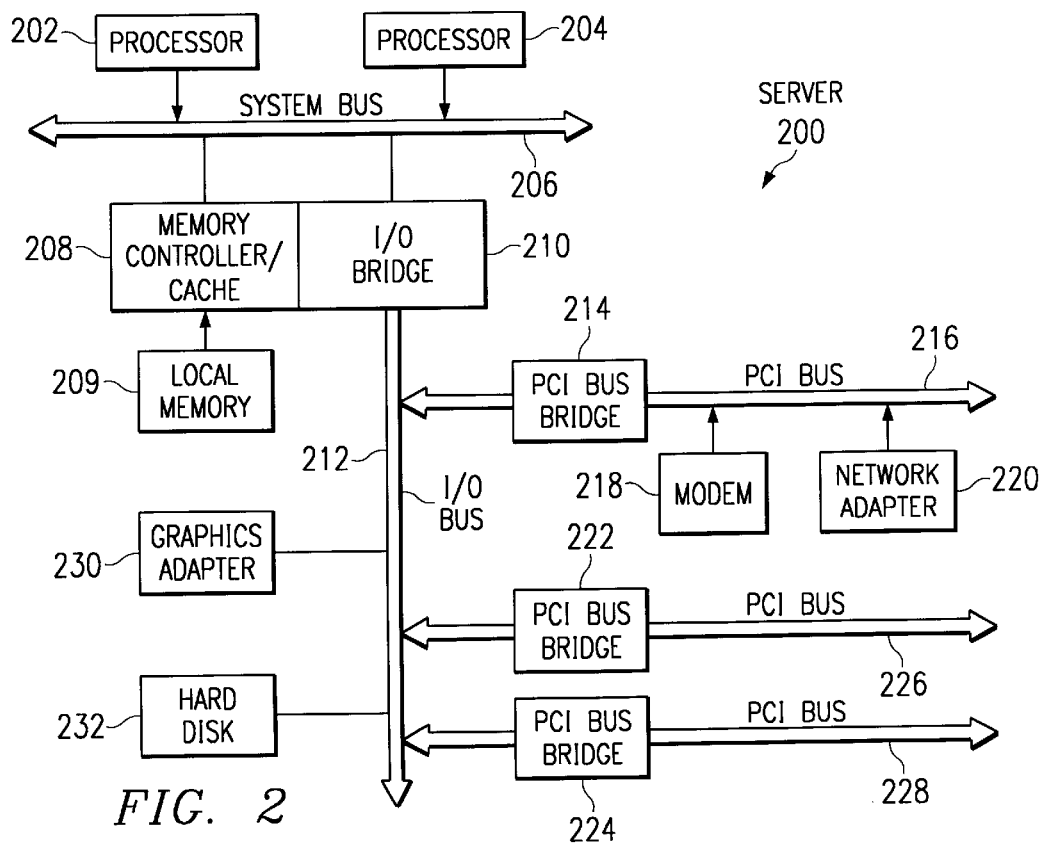
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
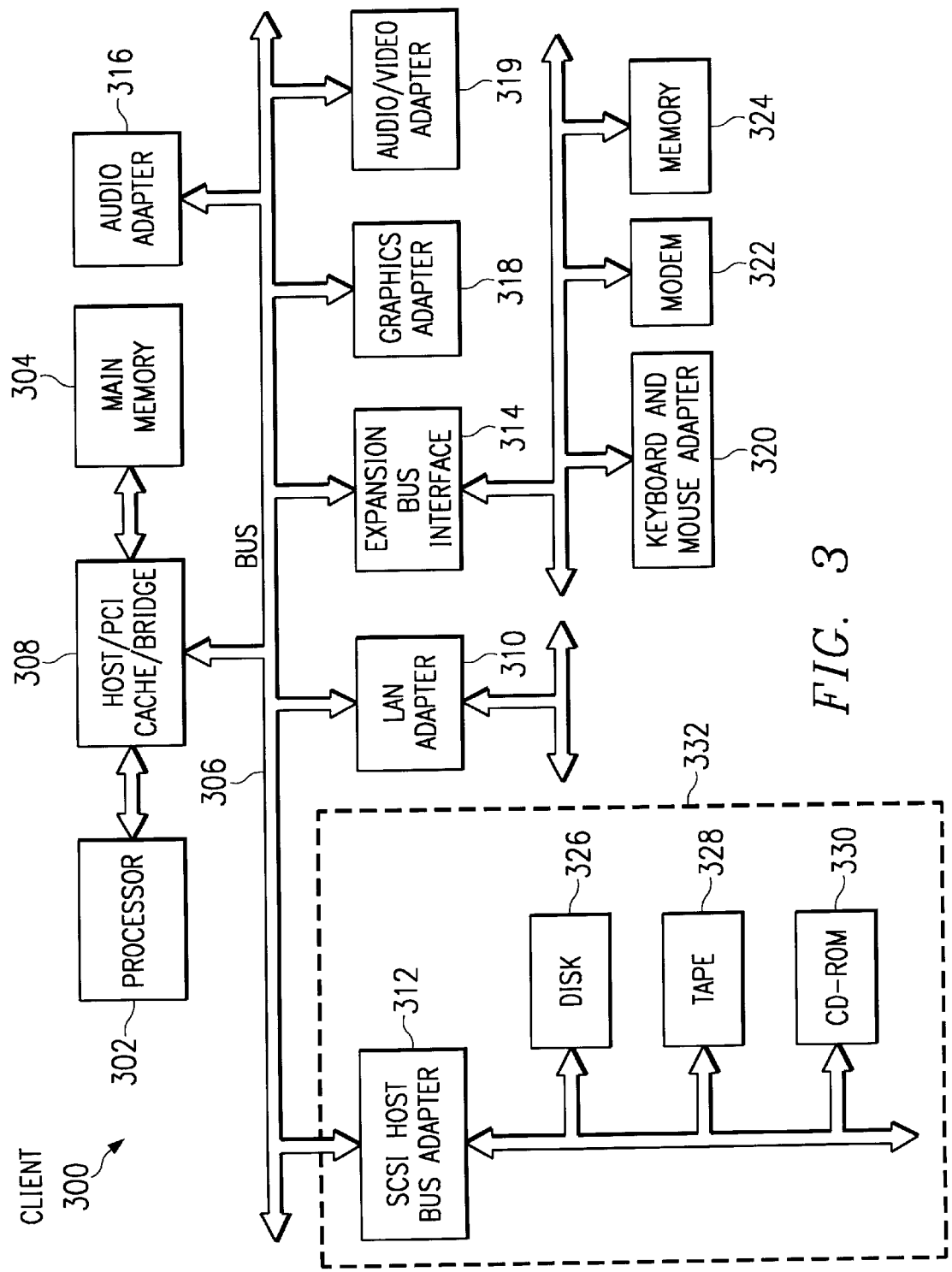
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which, is configured with ROM and/or flash ROM in order to provide non-volatile memory for storing operating system files and/or user generated data.

The depicted example in FIG. 3 and above-described examples are not meant to imply architectural limitations.

The present invention provides a method, apparatus, and instructions for maintaining session states. A session is a logical connection between two network accessible units that can be activated, tailored to provide various protocols, and deactivated as requested. Typically, each session is uniquely identified in a transmission header that companies transmissions exchanged during the session. A "session state" is a collection of arbitrary data items used by a web application whose lifetime extends beyond a single HTTP transaction. It is an abstraction of a mechanism to give a client an ID which it uses to identify itself on subsequent HTTP requests. It is used in Common Gateway Interface (CGI), Java Servlets, Java Server Pages (JSP), and Active Server Pages (ASP). The session state in the depicted examples are stored on a server for a relatively short period of time, such as three or five minutes. With this short period of time, the client browser performs a periodic "keep-alive" of the session state using a script timing loop that submits an HTTP request to the server side agent that resets the timeout threshold for the session state. In the depicted examples, a Javascript is placed in an HTML page that is being viewed by the browser at the client. The Javascript contains a timeout loop that wakes up occasionally, such as every three minutes if the server threshold is five minutes. The timeout loop performs a submit, targeting the process on the server that maintains session states, such as, for example, a reset servelet. The submit typically includes a session ID. In the depicted example, the data is submitted via a HTTP request and may be conveyed via a cookie, GET or POST methods. The reset servelet obtains the specified session data, resets the count down for the particular session state and returns a header to the client. This header leaves the page currently being displayed by the browser unchanged. In the depicted examples, the loop repeats itself as long as the user keeps the page displayed in the browser.

With reference now to FIG. 4, a block diagram illustrating the process used in maintaining session state is depicted in accordance with a preferred embodiment of the present invention. In this example, server 400 contains server processes 402, which provide various processes used in processing requests for access to resources located on server 400. For example, server 400 includes document 404, which may be returned in response to various requests handled by server processes 402.

Additionally, server processes 402 may maintain session states for various client applications. These session states are stored and maintained in session states databases 406. A client, such as client 408, may request a document from server 400 through browser 410. Browser 410 in the depicted examples may be a browser, such as Netscape Navigator, which is available from Netscape Communications Corporation. Of course browser 410 may be implemented as any program that is used to search for and retrieve various resources from a network. Upon sending a request to server 400, server processes 402 will process the request and return a document from documents 404 if a document meeting the request is present. This document in the depicted examples is a web page, such as web page 412, which is sent to client 408 and stored within client 408.

Turning next to FIG. 5, a block diagram of a browser program is depicted in accordance with a preferred embodiment of the present invention. Browser 500 includes a user interface 502, which is a graphical user interface (GUI) that allows the user to interface or communicate with browser 500. This interface provides for selection of various functions through menus 504 and allows for navigation through navigation 506. For example, menu 504 may allow a user to perform various functions, such as saving a file, opening a new window, displaying a history, and entering a URL. Navigation 506 allows for a user to navigate various pages and to select web sites for viewing. For example, navigation 506 may allow a user to see a previous page or a subsequent page relative to the present page. Preferences such as those illustrated in FIG. 5 may be set through preferences 508.

Communications 510 is the mechanism with which browser 500 receives documents and other resources from a network such as the Internet. Further, communications 510 is used to send or upload documents and resources onto a network. In the depicted example, communication 510 uses HTTP. Documents that are received by browser 500 are processed by language interpretation 512, which includes an HTML unit 514 and a JavaScript unit 516. Language interpretation 512 will process a document for presentation on graphical display 518. In particular, HTML statements are processed by HTML unit 514 for presentation while JavaScript statements are processed by JavaScript unit 516.

Graphical display 518 includes layout unit 520, rendering unit 522, and window management 524. These units are involved in presenting web pages to a user based on results from language interpretation 512.

Browser 500 is presented as an example of a browser program in which the present invention may be embodied. Browser 500 is not meant to imply architectural limitations to the present invention. Presently available browsers may include additional functions not shown or may omit functions shown in browser 500.

With reference now to FIG. 6, a web page is depicted in accordance with a preferred embodiment of the present invention. In this example, web page 600 includes HTML sections 602 and 604. Additionally, a Javascript section 606 also is contained within web page 600. In this example, Javascript section 606 also includes instructions for a timeout loop, which sends an indication to the server in response to an event. In the depicted examples, the event is the expiration of a timer or period of time. Of course, other types of events may be used, such as user activity with respect to the page. This user activity may be, for example, movement of a pointer over the page or other interaction, such as copying information from the page.

Figure 7:
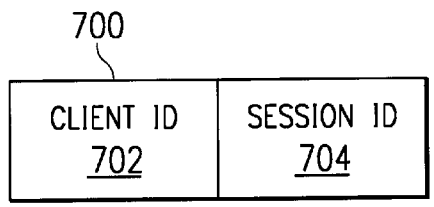
FIG. 7 is a diagram illustrating an indication depicted in accordance with a preferred embodiment of the present invention.

With reference now to FIG. 7, a diagram illustrating an indication is depicted in accordance with a preferred embodiment of the present invention. In this example, indication 700 includes client ID 702 to identify the client from which the indication is being sent. Additionally, session ID 704 is also included to allow the server to identify the session state for which the indication is being sent.

Two common mechanisms for giving a client an ID are through URL rewriting (the client puts its ID in the URL) (i.e., the user clicks on a link that goes to a URL named http://www.something.com/a page.html?id=userid39238) or through a non-persistent cookie (the user ID is stored in the browser, and is sent to the host with each HTTP request sent to that host.

Figure 8:
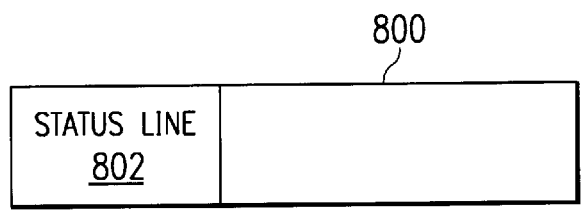
FIG. 8 is an illustration of a HTTP header depicted in accordance with a preferred embodiment of the present invention.

With reference to FIG. 8, an illustration of a HTTP header is depicted in accordance with a preferred embodiment of the present invention. In this example, header 800 illustrates the header returned to the client in response to receipt of an indication. The HTTP header code that the server returns to the client browser from a 'ping' is 204 No Content, which is located within status line 802 in header 800. This indicates that the server has fulfilled the request but there is no new information to send back. If the client is a user agent, it should not change its document view from that which caused the request to be sent. This response is primarily intended to allow input for actions to take place without causing a change to the user agent's active document view.

Figure 9:
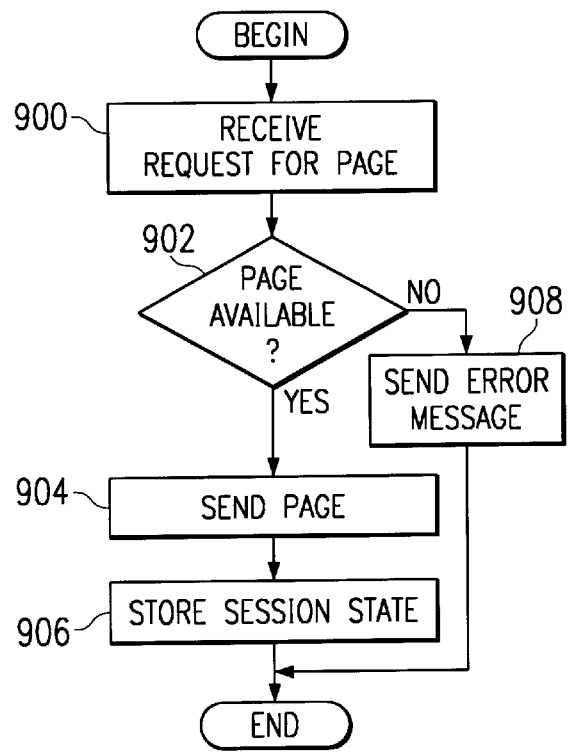
FIG. 9 is a flowchart of a process for handling requests at a server depicted in accordance with a preferred embodiment of the present invention.

With reference now to FIG. 9, a flowchart of a process for handling requests at a server is depicted in accordance with a preferred embodiment of the present invention. The process begins by receiving a request for a web page (step 900). A determination is made as to whether the web page is available (step 902). If the page is available, the page is sent to the requester (step 904). Thereafter, a session state is created and stored for the requester (step 906) with the process terminating thereafter.

With reference again to step 902, if a web page is not available, then an error message is sent back to the requester (step 908) with the process terminating thereafter.

Figure 10:
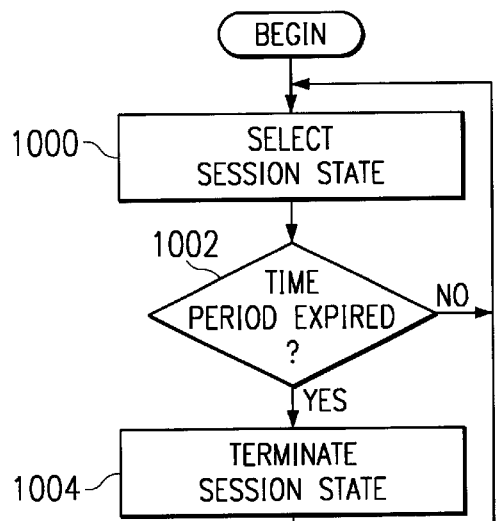
FIG. 10 is a flowchart of a process for maintaining session state depicted in accordance with a preferred embodiment of the present invention.

With reference now to FIG. 10, a flowchart of a process for maintaining session state is depicted in accordance with a preferred embodiment of the present invention. In this example, this process is run within the server processes located on the server.

The process begins by selecting a session for examination (step 1000). A determination is made as to whether the time period for the session state that has been selected has expired (step 1002). This determination may be made, for example, by checking a time stamp associated with the session state to determine whether the session state should be terminated. If the session state is older than some threshold, then the time period for the session state will have expired. Alternatively, a timer may be associated with the session state that is set to run for some selected period of time after which the session state will be terminated.

Figure 11:
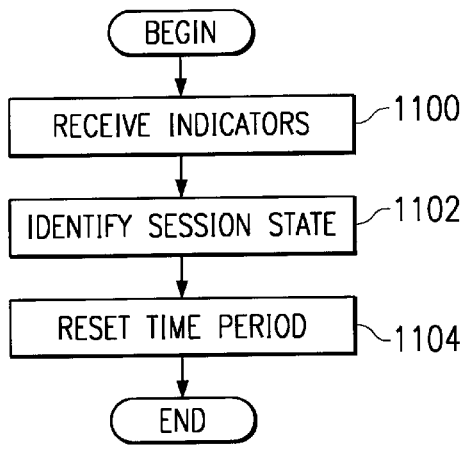
FIG. 11 is a flowchart of a process for processing an indication depicted in accordance with a preferred embodiment of the present invention.

If the time period for the session state has not expired, the process returns to step 1000 to select another session state for processing. Otherwise, the session state is terminated (step 1004) with the process then returning to step 1000 as described above. This process may be performed continuously or periodically on the server as a mechanism to check the session state. With reference now to FIG. 11, a flowchart of a process for processing an indication is depicted in accordance with a preferred embodiment of the present invention. The process receives an indication (step 1100). This indication is received from a client for a particular session state. The session state is identified (step 1102). Thereafter, the time period for the session state is reset (step 1104) with the process terminating thereafter. This may be done by resetting a timer associated with the session state or associating a new timestamp with the session state.

Figure 12:
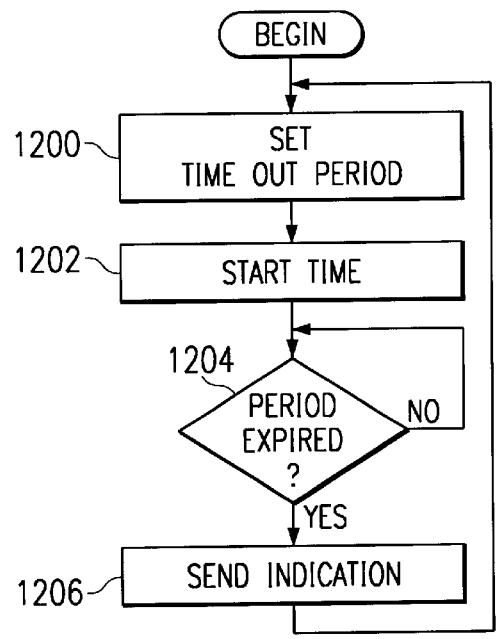
FIG. 12 is a flowchart of a process for a timeout loop depicted in accordance with a preferred embodiment of the present invention.

With reference now to FIG. 12, a flowchart of a process for a timeout loop is depicted in accordance with a preferred embodiment of the present invention. This timeout loop is implemented using Javascript in the depicted examples. The process begins by setting a timeout period (step 1200). Thereafter, a timer is started (step 1202). A determination is then made as to whether the period has expired (step 1204). If the period has not expired, the process returns to step 1204. Otherwise, an indication is sent to the server (step 1206) with the process then returning to step 1200 to reset the timeout period. In the depicted examples, the indication is sent to the server from which the page was sent. The page may contain an indication of the server to which the indication is to be sent in the instance that the session state is stored on a different server or the server to which the request was sent sends a request to another server to obtain the page and on which that server of the session state is stored.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples, use HTTP as the protocol, the processes of the present invention may be applied to other stateless protocols. Further, the process of the present invention may be implemented in other types of instructions other than Javascript, such as, for example, JScript, and ECMAScript. The processes also could be implemented as a Java applet that generates the heartbeat request.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for maintaining a session with a source through a stateless protocol comprising the data processing system implemented steps of:

receiving a page from the source through the stateless protocol; and sending an indication to the source through the stateless protocol in response to an event generated by code in the page while the page is displayed in the data processing system, wherein the indication prevents a termination of the session at the source.

2. The method of claim 1 further comprising:

displaying the page by a browser, wherein the indication is sent in response to the event while the page is displayed in the data processing system.

3. The method of claim 1, wherein the event occurs in response to an expiration of a timer.

4. The method of claim 1, wherein the code in the page defines the indication.

5. The method of claim 4, wherein the source is a web server and the page is a web page.

6. The method of claim 5, wherein the web page is displayed in a browser program.

7. The method of claim 1, wherein the event occurs periodically.

8. The method of claim 1, where the page includes instructions to trigger the event.

9. The method of claim 1, wherein the client is a personal computer.

10. The method of claim 1, wherein the client is a personal digital assistant.

11. The method of claim 1, wherein the stateless protocol is a hypertext transfer protocol.

12. A method in a data processing system for maintaining a session comprising the data processing system implemented steps of:

maintaining a plurality of documents, wherein each document within the plurality of documents includes instructions to periodically send an indication to the server from a client while the document is displayed on the client;

monitoring for a request for a document;

responsive to receiving a request from a client for a document from the plurality of documents, sending the document to the client;

responsive to sending the document, initiating a session;

responsive to sending the document, monitoring for the indication from the client;

terminating the session after a period of time occurs without receiving the indication; and responsive to receiving an indication from the client, maintaining the session and resetting the period of time.

13. The method of claim 12, wherein the document is a web page and the instructions form a script in the web page.

14. A web page in a computer readable medium for maintaining a session through a stateless protocol comprising:

a first set of statements, wherein the first set of statements are used by the browser to display information to a user; and a second set of statements, wherein the second set of statements periodically send an indication to a server maintaining a session state, wherein the indication causes the server to maintain the session state.

15. The web page of claim 14, wherein the second set of statements form a timeout loop.

16. The web page of claim 14, wherein the second set of statements form a script.

17. The web page of claim 14, wherein the script is a Javascript.

18. The web page of claim 14, wherein the indication is a submit.

19. The web page of claim 14, wherein the server is a source of the web page.

20. The web page of claim 14, wherein the server includes a reset program that removes the session state after a set period of time unless reset and wherein the submit resets the reset program for the session state.

21. A distributed data processing system comprising:

a network;

a plurality of clients connected to the network;

a server connected to the network, wherein the server includes a plurality of web pages;

wherein the server sends a web page to a client within the plurality of clients in response to a request for the web page, and stores a session state for the client until expiration of a selected period of time; and wherein the client, responsive to a display of the page at the client, sends an indicator, generated using code in the Web page, to the server to reset the selected period of time to maintain the session state stored at the server.

22. A data processing system for maintaining a session with a source through a stateless protocol comprising:

receiving means for receiving a page from the source through the stateless protocol; and sending means for sending an indication to the source through the stateless protocol in response to an event generated by code in the page while the page is displayed in the data processing system, wherein the indication prevents a termination of the session at the source.

23. The data processing system of claim 22 further comprising:

displaying means for displaying the page by a browser, wherein the indication is sent in response to the event while the page is displayed in the data processing system.

24. The data processing system of claim 22, wherein the event occurs in response to an expiration of a timer.

25. The data processing system of claim 22, wherein the code in the page defines the indication.

26. The data processing system of claim 25, wherein the source is a web server and the page is a web page.

27. The data processing system of claim 26, wherein the web page is displayed in a browser program.

28. The data processing system of claim 22, wherein the event occurs periodically.

29. The data processing system of claim 22, where the page includes instructions to trigger the event.

30. The data processing system of claim 22, wherein the client is a personal computer.

31. The data processing system of claim 22, wherein the client is a personal digital assistant.

32. The data processing system of claim 22, wherein the stateless protocol is a hypertext transfer protocol.

33. A data processing system for maintaining a session comprising:

maintaining means for maintaining a plurality of documents, wherein each document within the plurality of documents includes instructions to periodically send an indication to the server from a client while the document is displayed on the client;

monitoring means for monitoring for a request for a document;

sending means, responsive to receiving a request from a client for a document from the plurality of documents, for sending the document to the client;

initiating means, responsive to sending the document, for initiating a session;

monitoring means, responsive to sending the document, for monitoring for the indication from the client;

terminating means for terminating the session after a period of time occurs without receiving the indication; and maintaining means, responsive to receiving an indication from the client, for maintaining the session and resetting the period of time.

34. The data processing system of claim 33, wherein the document is a web page and the instructions form a script in the web page.

35. A computer program product in a computer readable medium for maintaining a session with a source through a stateless protocol comprising:

first instructions for receiving a page from the source through the stateless protocol; and second instructions for sending an indication to the source through the stateless protocol in response to an event generated by code in the page while the page is displayed in the data processing system, wherein the indication prevents a termination of the session at the source.

36. A computer program product in a computer readable medium for maintaining a session comprising:

first instructions for maintaining a plurality of documents, wherein each document within the plurality of documents includes instructions to periodically send an indication to the server from a client while the document is displayed on the client;

second instructions for monitoring for a request for a document;

third instructions, responsive to receiving a request from a client for a document from the plurality of documents, for sending the document to the client;

fourth instructions, responsive to sending the document, for initiating a session;

fifth instructions, responsive to sending the document, for monitoring for the indication from the client;

sixth instructions for terminating the session after a period of time occurs without receiving the indication; and seventh instructions, responsive to receiving an indication from the client, for maintaining the session and resetting the period of time.

* * * * *